(12) United States Patent
Kane

(10) Patent No.: US 11,972,515 B1
(45) Date of Patent: Apr. 30, 2024

(54) SYSTEMS AND METHODS FOR CUSTOMIZING MOTION ASSOCIATED WITH POINT CLOUD ANIMATIONS

(71) Applicant: Illuscio, Inc., Culver City, CA (US)

(72) Inventor: Luke Kane, Culver City, CA (US)

(73) Assignee: Illuscio, Inc., Culver City, CA (US)

(*) Notice: Subject to any disclaimer, the term of this patent is extended or adjusted under 35 U.S.C. 154(b) by 0 days.

(21) Appl. No.: 18/480,205

(22) Filed: Oct. 3, 2023

(51) Int. Cl.
 *G06T 13/20* (2011.01)
 *G06T 19/00* (2011.01)

(52) U.S. Cl.
 CPC .............. *G06T 13/20* (2013.01); *G06T 19/00* (2013.01); *G06T 2200/24* (2013.01); *G06T 2210/56* (2013.01)

(58) Field of Classification Search
 None
 See application file for complete search history.

(56) References Cited

U.S. PATENT DOCUMENTS

| | | | |
|---|---|---|---|
| 10,861,175 B1 * | 12/2020 | Monaghan | G06V 20/698 |
| 11,557,074 B1 | 1/2023 | Good | |
| 2023/0076821 A1 * | 3/2023 | Smith | G06T 7/0012 |

\* cited by examiner

*Primary Examiner* — Nurun Flora
(74) *Attorney, Agent, or Firm* — Ansari Katiraei LLP; Arman Katiraei; Sadiq Ansari (57) ABSTRACT

Disclosed is a system and associated methods for rigging points of a point cloud for animation and customizing the animation for different subsets of rigged points in order to rapidly and easily generate complex animations. Generating a complex animation involves defining an animation element in the point cloud space, defining an animation for moving the animation element, linking points of the point cloud to the animation element, and adjusting the animation from the animation element that is applied to a first subset of the linked points based on a selection of the first subset of linked points that is made using an adjustment tool. The system renders the complex animation by moving a second subset of the linked points according to the defined animation of the animation element and by moving the first subset of linked points according to the defined animation as adjusted by the adjustment tool.

20 Claims, 9 Drawing Sheets

FIG. 9

SYSTEMS AND METHODS FOR CUSTOMIZING MOTION ASSOCIATED WITH POINT CLOUD ANIMATIONS

BACKGROUND

Animation rigging has been used with mesh-based or polygon-based three-dimensional ("3D") models to simplify the animation of these 3D models. The rigging may include defining a animation framework with "bones" that have various pivot points. Bones from the animation framework that share a common pivot point may be defined with weighting to specify how and where one bone moves about a pivot point when the neighboring bone is moved. The meshes or polygons of a 3D model may then be linked or layered over the wireframe so that they move in conjunction with movements defined for the bones and/or pivot points of the animation framework.

While effective in generating fast and simplistic animations, the linking of meshes to the animation framework is often insufficient to produce high-quality or realistic animations. For instance, a set of meshes that are linked to a particular bone may move uniformly relative to the bone. Accordingly, the animation may not capture subtle nuisances that occur during movement of an object represented by the set of meshes. More specifically, the animation does not account for or recreate how different features or parts of a real-world object may react or move differently in response to the application of the same force, effect, or motion. For instance, the animation rigging techniques cannot be used to replicate the complex movement associated with a muscle contraction or expansion since the meshes representing a muscle in a 3D model have to be associated with motion of separate muscle fibers and cannot be moved in unison if attempting to realistically replicate the motion of that muscle. Also, many of the animation techniques that are applied to the meshes or polygons of a 3D model do not translate or cannot be applied to points of a point cloud representation of that same particular object since the point cloud points are detached from one another and cannot be stretched or skewed in the same manner as the meshes or polygons. Accordingly, new techniques are required for detailed or complex animation of point clouds.

DETAILED DESCRIPTION OF PREFERRED EMBODIMENTS

The following detailed description refers to the accompanying drawings. The same reference numbers in different drawings may identify the same or Provided are systems and associated methods for customizing motion associated with point cloud animations. The systems and methods provide a tool for the nonuniform rigging of points from a point cloud representation of a three-dimensional ("3D") object to bones, pivot points, and/or other animation elements associated with an animation framework. The tool adjusts the amount of motion that is transferred from a bone, pivot point, or animation element to different points of a set of points that are linked to that bone, pivot point, or animation element, and/or changes the motion of different linked points relative to the motion that is defined for the bone, pivot point, or animation element. Stated differently, the tool adjusts how the animation of the bone, pivot point, or animation element influences the animation of different points in the linked set of points so that the linked set of points do not move uniformly relative to the bone, pivot point, or animation element. In this manner, an animator may generate complex and/or realistic animations involving nonuniform movements of points without having to manually select thousands or millions of individual points to adjust their motion relative to the motion of an animation element from an animation framework.

Figure 1:
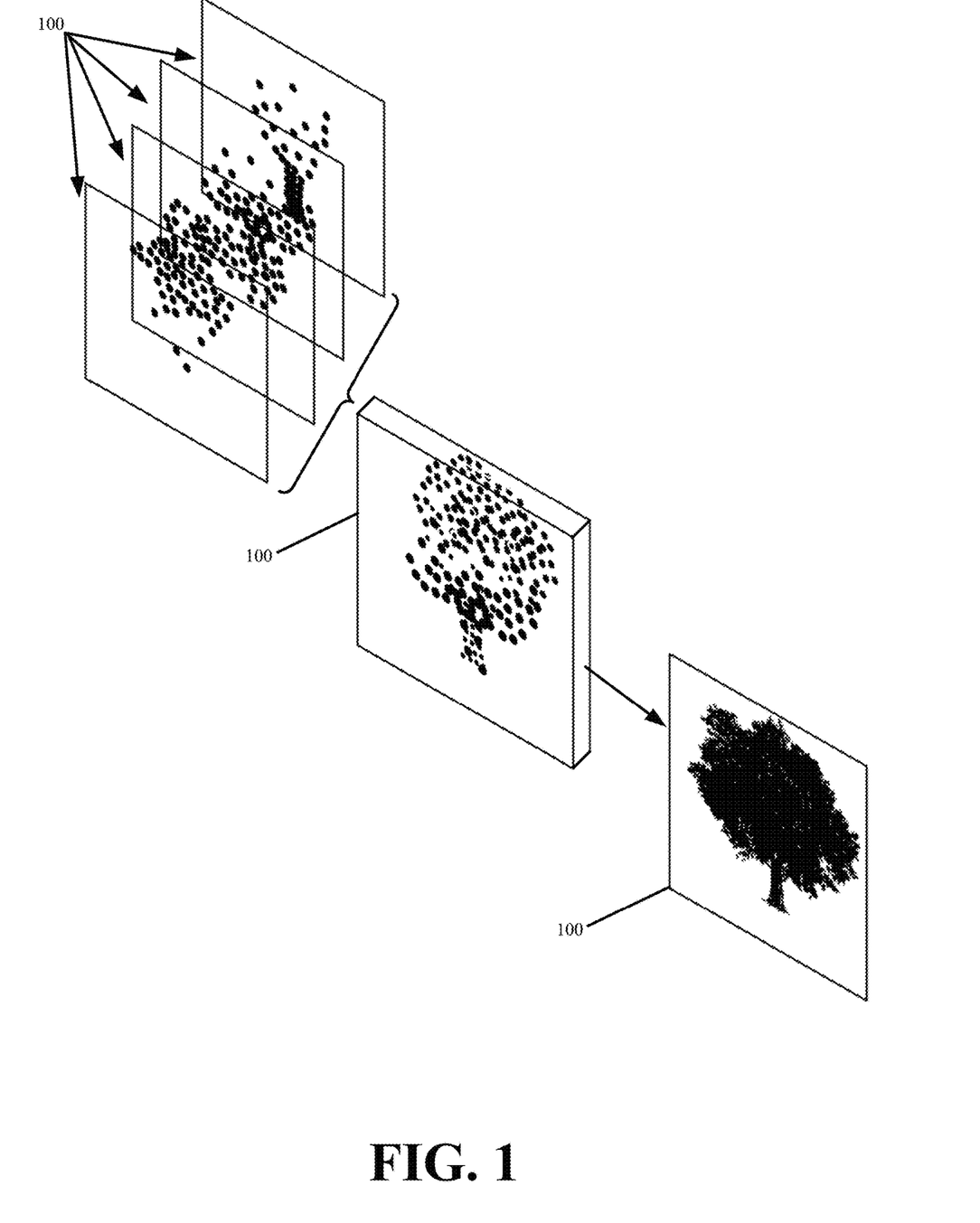
FIG. 1 illustrates an example point cloud in accordance with some embodiments presented herein.

FIG. 1 illustrates an example point cloud 100 in accordance with some embodiments presented herein. Point cloud 100 may represent a 3D object or 3D model that is to be animated through the creation of an animation framework and the linking of the points from point cloud 100 to bones, pivot points, and/or other animation elements of the animation framework.

The points of point cloud 100 may differ from pixels of a two-dimensional ("2D") image, because certain regions of point cloud 100 may have no points, lower densities of points, and/or higher densities of points based on varying amounts of visual information that is detected or scanned at those regions. Additionally, the position of the point cloud points may be defined in 3D space using x, y, and z coordinate values. In contrast, pixels of a 2D image are defined in 2D space and have a uniform density or fixed arrangement that is defined by the resolution of the 2D image. In other words, the point cloud points may have a non-uniform placement or positioning, whereas the 2D image may have pixel data for each pixel of a defined resolution (e.g., 640×480, 800×600, etc.).

The points of point cloud 100 also differ from meshes or polygons of a 3D mesh model in that the points are disconnected from one another whereas the meshes or polygons are connected in order to create the shape or form of a represented 3D object. Moreover, the meshes or polygons may be stretched or skewed to change the overall shape of the represented 3D object, whereas the points represent are typically of a fixed size and/or shape.

Each point cloud point may be defined with a plurality of elements. The plurality of elements may include a first set of positional elements and a second set of non-positional or descriptive elements.

The positional elements may include coordinates within a 3D space. For instance, each point cloud point may include x-coordinate, y-coordinate, and z-coordinate elements to capture the position of an imaged surface, feature, or article of the 3D object or the 3D environment in the 3D space.

The non-positional elements may include information about the detected characteristics of the surface, feature, or article imaged at a corresponding position in the 3D space. The characteristics may correspond to a detected color. The color may be represented using red, green, blue ("RGB"), and/or other values. In some embodiments, the characteristics may provide the chrominance, hardness, translucence, reflectivity, luminance, metallic characteristics, roughness, specular, diffuse, albedo, index of refraction ("TOR"), and/or other properties of the imaged surface, feature, or article. In some embodiments, the non-positional elements may directly identify a material property or other classification for a point. For instance, a first point may be defined with a non-positional element with a value that identifies the material property of "aluminum", a second point may be defined with a non-positional element with a value that identifies the material property of "steel", and a third point may be defined with a non-positional element with a value that identifies the material property of "plastic".

In some embodiments, the characteristics may be related to properties of the device used to generate each of the points. For instance, the characteristics may include a Tesla strength value to quantify the strength of the magnetic field that was used in detecting and/or imaging the surface, feature, or article represented by a particular point cloud point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding point in the 3D space.

Each point cloud point may include an array of elements. The array of elements may provide the positioning of the point in the 3D space as well as one or more characteristics of that point. For instance, a point cloud point may be stored and/or represented as an array of elements with some combination of x-coordinate, y-coordinate, z-coordinate, red, green, blue, chrominance, hardness, translucence, reflectivity, luminance, metallic characteristics, roughness, specular, diffuse, albedo, IOR, tesla, and/or other values.

Point cloud 100 and the individual points of point cloud 100 may be generated by a 3D or depth-sensing camera, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, and/or other imaging equipment for 3D objects, volumetric objects, or 3D environments. Point cloud 100 may be generated from output of two or more devices. For instance, a first imaging device (e.g., a LiDAR sensor) may determine the position for each point in the 3D space, and a second imaging device (e.g., a high-resolution camera) may measure or capture the characteristics or other non-positional information for each point. One or more photogrammetry techniques may be used to consolidate the data from the first imaging device and the second imaging device, and to create point cloud 100.

Figure 2:
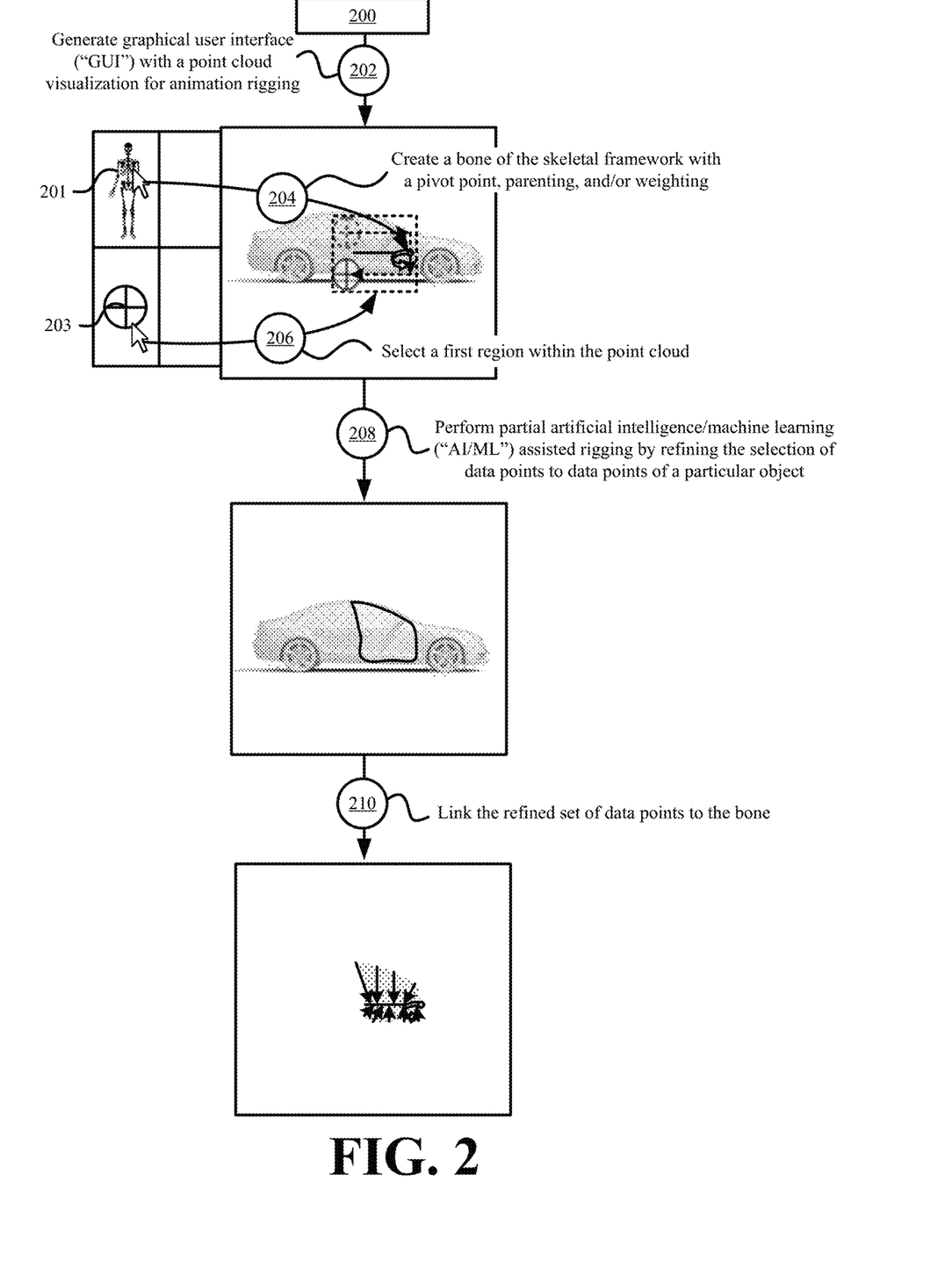
FIG. 2 illustrates an example of rigging a point cloud for animation in accordance with some embodiments presented herein.

FIG. 2 illustrates an example of rigging a point cloud for animation in accordance with some embodiments presented herein. Point cloud animation system ("PCAS") 200 may load and/or render a point cloud that is to be animated. Rendering the point cloud may include generating a visualization of the 3D object or 3D model represented by the point cloud points. More specifically, rendering the point cloud may include defining visual points of reference based on the positional elements and non-positional elements of each point in the point cloud.

PCAS 200 may generate (at 202) a graphical user interface ("GUI") to present the visualization (e.g., rendered point cloud) to a user for rigging. The GUI may include various interactive user interface ("UI") elements or interactive tools for rigging the visualized points to a animation framework.

The user may use first interactive tool 201 to create (at 204) a bone of the animation framework within the 3D space of the visualization. Creating (at 204) the bone may include drawing a straight, curved, or jagged line that represents the bone. In some embodiments, the bone may be a multi-dimensional (e.g., 3D) shape with segments that extend across different planes or axes. In some embodiments, the bone may be connected to or linked to other bones of the animation framework via one or more pivot points. The bone may cut through and/or intersect one or more of the point cloud points represented in the visualization. In other words, the coordinates of the user-defined bone may have x, y, and z coordinates that match the positional coordinates of one or more point cloud points.

Creating (at 204) the bone may further include defining one or more pivot points about which the bone may rotate or move, and/or defining a parenting or a relationship between the user-created bone and other bones of the animation framework that may be already defined. Defining the parenting or the relationship may include connecting the user-created bone to other bones of the animation framework, and specifying a weighting that controls how the user-created bone moves when a force or movement is applied to another connected bone of the animation framework.

Once the shape and position of the user-defined bone are established, PCAS 200 may associate a unique identifier to the user-defined bone. The unique identifier may be a numerical value or pointer for referencing or accessing the user-defined bone and for differentiating the user-defined bone from other bones that may be part of the same animation framework.

The user may use second interactive tool 203 to select (at 206) a first region of the visualized 3D object or 3D model. The first region may include a volume of 3D space that includes a first set of the point cloud points. PCAS 200 may identify the first set of points by determining the coordinates covered by the selected volume or region of space, and by determining that the positional elements of the first set of points are within the coordinates covered by the selected volume or region of space.

In some embodiments, the selection tools (e.g., second interactive tool 203) may include adjustable 3D shapes (e.g., sphere, cube, cuboid, cylinder, etc.) for selecting the volume of 3D space. In some embodiments, the selection tools may include a freeform tool that may be used to select any 2D or 3D region of space.

Given the density of the point cloud points, the selected first set of points may include points of two or more objects that the user may want to animate separately or have different animations. Also, it may be very time consuming and difficult to select and differentiate the points of one object from other objects especially when the objects may be linked or touching one another. Accordingly, the selection (at 206) of the first region and/or the first set of points is intended to be a rough selection that mostly includes points of a first object, and may include points of other surrounding objects or background objects. For instance, the selection (at 206) shown in FIG. 2 may mostly include points of the passenger front door, but may also include points of the rear passenger door, a section of the roof, and a side panel of the vehicle engine compartment.

PCAS 200 may use one or more artificial intelligence and/or machines learning ("AI/ML") techniques to modify (at 208) the selection and partially assist in the rigging of the point cloud points to the created bone. Modifying (at 208) the selection may include automatically identifying a particular object that is represented by the majority of the first set of points falling within the selected first region, removing one or more points from the first set of points that are not associated with or part of the particular object, and adding one or more points outside the selected first region that are associated with or part of the particular object. Specifically, PCAS 200 may use the AI/ML techniques to analyze the positional and non-positional elements of the first set of points, determine positional commonality amongst a threshold percentage or number of the first set of points (e.g., more than half of the first set of points or at least 80% of the first set of points having the determined positional commonality), and/or determine non-positional commonality amongst the threshold percentage or number of the first set of points.

Determining the positional commonality may include using one or more regression techniques, pattern recognition techniques, predictive analytics, and/or other AI/ML techniques to determine whether the first set of points are arranged or positioned according to a pattern, a structure, or a recognized object. For instance, a first object (e.g., vehicle door) may have points that are positioned and spaced according to a particular pattern or structure, or may have points that are a certain distance or offset from one another. Points of a second object (e.g., vehicle roof) may have positioning, spacing, distances, or offsets that deviate from those of the first object, and PCAS 200 may modify (at 208) the user selection by removing the points of the second object from the first set of points or the points that deviate from the positioning, spacing, distances, or offsets of the first object. Similarly, the AI/ML techniques may analyze the arrangement of the first set of points to determine that the points represent a particular object, and may add, to the first set of points in the user selection that represent the first object, one or more points that are a threshold distance outside the user selection and that share the positioning, arrangement, pattern, spacing, distances, and/or offsets with the first set of points representing the first object.

Determining the non-positional commonality may include using one or more regression techniques, pattern recognition techniques, predictive analytics, and/or other AI/ML techniques to determine whether the first set of points have common visual characteristics (e.g., coloring) and/or other commonality (e.g., common material properties, albedo values, etc.) amongst the non-positional elements. For instance, a first object may have points that span a specific range of RGB color values. The AI/ML techniques may identify that a majority of the first set of points have RGB color values within the specific range of RGB color values, and may modify (at 208) the user selection by removing other points from the first set of points that do not have the RGB color values, and by adding points that are a threshold distance outside the user selection and that are defined with RGB color values that are within the specific range of RGB color values.

Determining the non-positional commonality may also include identifying the material property that is defined as a non-positional element for the majority of the first set of points, removing points from the first set of points that are defined with a different material property, and adding points that neighbor the first set of points, that are outside the user-selected region, and that are defined with the same material property as the majority of the points within the first set of points.

In some embodiments, the AI/ML techniques may modify (at 208) the user selection based on a combination of positional and non-positional commonality. For instance, PCAS 200 may analyze the positional and non-positional elements of the first set of points within the user selected region using the AI/ML techniques to identify positional and non-positional commonality shared by a threshold percentage or number of the points. PCAS 200 may use the combined positional element and non-positional element commonality to identify and remove points within the first set of points that do not have the combined positional element and non-positional element commonality and to add points to the first set of points that are a threshold distance outside the user selection and that share the combined positional element and non-positional element commonality.

PCAS 200 may link (at 210) the modified first set of points to the user-defined bone of the animation framework, thereby rigging the modified first set of points to the user-defined bone. Linking (at 210) the modified first set of points to the user-defined bone includes uniformly transferring any motion or animation that is defined for the user-defined bone to the modified first set of points. In other words, the modified first set of points are linked (at 210) to move in unison and maintain their positions relative to the user-defined bone over the course of an animation defined for the user-defined bone.

In some embodiments, linking (at 210) the modified first set of points may include associating the identifier of the user-defined bone to each point of the modified first set of points. For instance, PCAS 200 may define a non-positional element of each point of the modified first set of points with the unique identifier of the user-defined bone. From the non-positional element, PCAS 200 is able to identify which points are linked to which bones, and which points should be moved in response to an animation that is applied to a bone. In some embodiments, linking (at 210) the modified first set of points may include associating a unique identifier of each point from the modified first set of points to an array of the user-defined bone. For instance, the positional elements of the modified first set of points may unique identify each of the modified first set of points. PCAS 200 may link an array to the user-defined bone that includes the positional elements or unique identifier of each point in the modified first set of points. Accordingly, when the user-defined bone is animated or moved, PCAS 200 may perform a lookup of the linked array to determine which points from the point cloud to animate in conjunction with the user-defined bone.

To facilitate the movement of points in relation to the bone, the linking (at 210) may include determining the distance of each point of the modified first set of points to the bone, and maintaining that distance when the linked bone is moved. In some embodiments, PCAS 200 may compute the distance from each point in the modified first set of points to one or more points along the bone or may determine a vector that separates the point from the bone, and may record the computed distances or vector as a positional or non-positional element of the point.

The above-described rigging produces simple animations in which the modified first set of points move uniformly according to the motion that is specified for the linked (at 210) bone. Specifically, the animation involves defining a movement for the bone, animating the modified first set of points to retain their distance from the bone as the bone progresses through the defined movement, and presenting the animation of the modified first set of points and other points of the points without rendering and/or presenting the bone or other animation elements of the animation framework that define the animation of the point cloud points.

A complex animation of the modified first set of points may involve defining a nonuniform movement for one or more points of the modified first set of points relative to the movement of the bone. In other words, deviating the motion of some points from the movement of the bone may add detail and/or nascence to the animation that increases the realism and/or quality of the animation.

PCAS 200 provides an influence tool to customize or adjust the motion of different subsets of the modified first set of points relative to the motion that is defined for the bone of the animation framework that the modified first set of points are rigged or linked to. The influence tool changes the motion or amount of motion that is transferred from the bone to the different subsets of the modified first set of points and/or the amount by which the animation of the bone influences the animation of different points in the modified first set of points. Accordingly, the influence tool allows an animater to quickly differentiate the application of motion from the linked bone to the modified first set of points, and thereby introduce complexity in the rigging of the point cloud points and in the resulting animation by defining nonuniform movements for the modified first set of points that are linked to the same bone without having to manually select each point and adjust the motion for each manually selected point.

Figure 3:
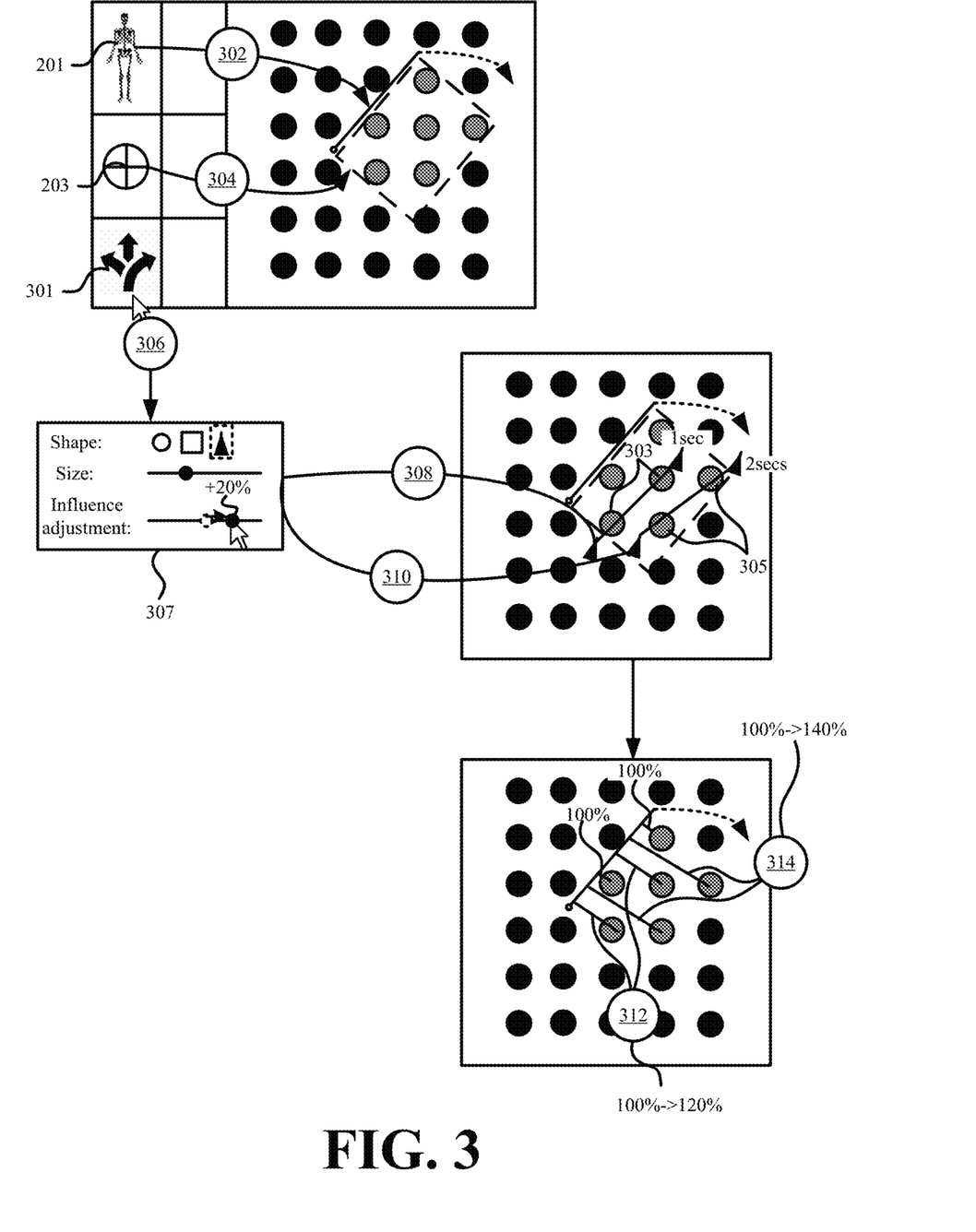
FIG. 3 illustrates an example of adjusting the amount by which the animation of a particular animation element from an animation framework influences the animation of a set of points from a point cloud that are linked or rigged to that particular animation element using the influence tool in accordance with some embodiments presented herein.

FIG. 3 illustrates an example of adjusting the amount by which the animation of a particular animation element from an animation framework influences the animation of a set of points from a point cloud that are linked or rigged to that particular animation element using the influence tool in accordance with some embodiments presented herein. A user may define (at 302) the particular animation element as a particular bone and/or pivot point, and may rig or link (at 304) the set of points to the particular animation element so that the set of points move in conjunction with movements defined for the particular animation element.

PCAS 200 activates (at 306) the influence tool in response to a user selection of UI element 301 representing the influence tool. Activating (at 306) the influence tool includes presenting configuration interface 307 by which the user may adjust parameters of the influence tool. For instance, configuration interface 307 presents a first adjustable parameter for setting the shape of the influence tool, a second adjustable parameter for setting the size of the influence tool, and a third adjustable parameter for setting the amount by which the influence tool adjusts the influence between the particular animation element and different points that are selected using the influence tool.

In some embodiments, activating (at 306) the influence tool includes changing a user controlled pointer into the shape and/or size defined for the influence tool by the first and second adjustable parameters. For instance, the influence tool may correspond to a brush tool with a circular, square, pointed, or other shape that is selected based on the first adjustable parameter. The size of the chosen shape for the influence tool changes according to the second adjustable parameter. The shape and size of the influence tool change the number of points that may be selected and/or affected by the influence tool at one time. For instance, a smaller shape and size may be used to more granularly adjust the particular animation element's influence on specific points in the linked set of points, whereas a larger shape and size may be used to adjust the particular animation element's influence on a larger subset of the set of points.

The third adjustable parameter controls the amount by which the motion of points selected with the influence tool deviate from the motion of the particular animation element. For instance, the set of points may initially be rigged or linked to move in proportion or with a 100% of the movement that is defined for the particular animation element. The influence tool may be applied to a subset of points such that the subset of points move with 90% of the movement that is defined for the particular animation element when the third adjustable parameter has a first value (e.g., 90%), move with 75% of the movement that is defined for the particular animation element when the third adjustable parameter has a second value (e.g., 75%), and move with 50% of the movement that is defined for the particular animation element when the third adjustable parameter has a third value (e.g., 50%).

In some embodiments, the third adjustable parameter specifies a rate by which the influence of the particular animation element on a selected subset of points is modified based on the amount of time the influence tool is applied to the selected subset of points. The third adjustable parameter may be used to increase or decrease the amount of motion that is defined for the particular animation element and that is transferred to one or more points that are linked to that particular animation element and that are selected using the influence tool. For instance, if the user applies the influence tool over a first subset of points for one second with the third adjustable parameter set to a first value, PCAS 200 may adjust the rigging such that the first subset of points move with 90% of the movement that is defined for the particular animation element, and if the user applies the influence tool over the first subset of points for two seconds with the third adjustable parameter set to the first value, PCAS 200 may adjust the rigging such that the first subset of points move with 80% of the movement that is defined for the particular animation. The user may adjust the third adjustable parameter from the first value to a second value and may apply the influence tool over a second subset of points for two seconds with the third adjustable parameter set to the second value. PCAS 200 may adjust the rigging of the second subset of points such that the second subset of points move with 50% of the movement of the particular animation element in response to applying the influence tool to the second subset of points for two seconds with the second value set for the third adjustable parameter (e.g., a 25% influence reduction for every second the influence tool is applied with the third adjustable parameter set to the second value).

In some embodiments, the influence tool may include other parameters for not only increasing or decreasing the motion that is applied from a linked animation element to selected points, but changing the motion. For instance, the influence tool may be used to cause the selected points to rotate away from the motion of the linked animation element, move in a different direction, change the angle of movement, and/or otherwise be positional offset from an initial relative position between the points and the moving position of the linked animation element.

After activating (at 306) the influence tool and/or configuring parameters of the influence tool (e.g., shape, size, influence adjustment amount, etc.), the user applies (at 308) the influence tool to first subset of points 303 that are linked to the particular animation element. Specifically, the user moves the pointer over first subset of points 303 and applies (at 308) the influence tool to first subset of points 303 by pressing a mouse button, pressing a keyboard key, performing a gesture (e.g., finger tap), or by providing other input for one second. The user also applies (at 310) the influence tool for two seconds to second subset of points 305 that are linked to the particular animation element.

PCAS 200 detects or tracks the influence tool being applied (at 308) to first subset of points 303 for the one second duration, and adjusts (at 312) the influence that the defined motion of the particular animation element has on first subset of points 303. Due to the configured parameters of the influence tool and the one second application (at 308) of the influence tool, PCAS 200 adjusts (at 312) the influence by increasing the amount of motion that is transferred from the particular animation element to first subset of points 303 by 20%.

Similarly, PCAS 200 detects or tracks the influence tool being applied (at 310) to second subset of points 305 for the two second duration, and adjusts (at 314) the influence that the defined motion of the particular animation element has on second subset of points 305. Specifically, PCAS 200 increases the amount of motion that is transferred from the particular animation element to second subset of points 305 by 40%.

PCAS 200 may record or store the adjustments in one or more non-positional elements of affected points 303 and 305. For instance, the animation may defined as a function, transform, or other sequence of movements that are stored as part of the particular animation element data structure. The set of points are linked to the particular animation element by defining a non-positional element of each point from the set of points with the identifier of the particular animation element. PCAS 200 may also add the influence adjustment to that non-positional element or another non-positional element of adjusted points 303 and 305. For instance, each point of first subset of points 303 may include one or more non-positional elements that are defined with the identifier of the particular animation element and an influence adjustment value of +20%, and each point of second subset of points 305 may include one or more non-positional elements that are defined with the identifier of the particular animation element and an influence adjustment value of +40%.

When PCAS 200 renders the point cloud animation, PCAS 200 retrieves the animation framework that is associated with the point cloud, determines the animations defined for each animation element of the animation framework, selects the set of points that are defined with the identifier of an animation element, and animates the set of points based on the animation that is defined for the identified animation element and any influence adjustments stored or associated with individual points of the set of points. Animating the set of points includes rendering a first frame of the animation with the points at positions defined in the positional elements of the points, rendering subsequent frames of the animation by adjusting the point positions and/or non-positional elements according to the animation defined for the animation element that is linked to that set of points and that is specified for the time corresponding to each subsequent frame and by further adjusting the point positions and/or non-positional elements by any influence adjustments applied to and stored with individual points of the set of points.

Figure 4:
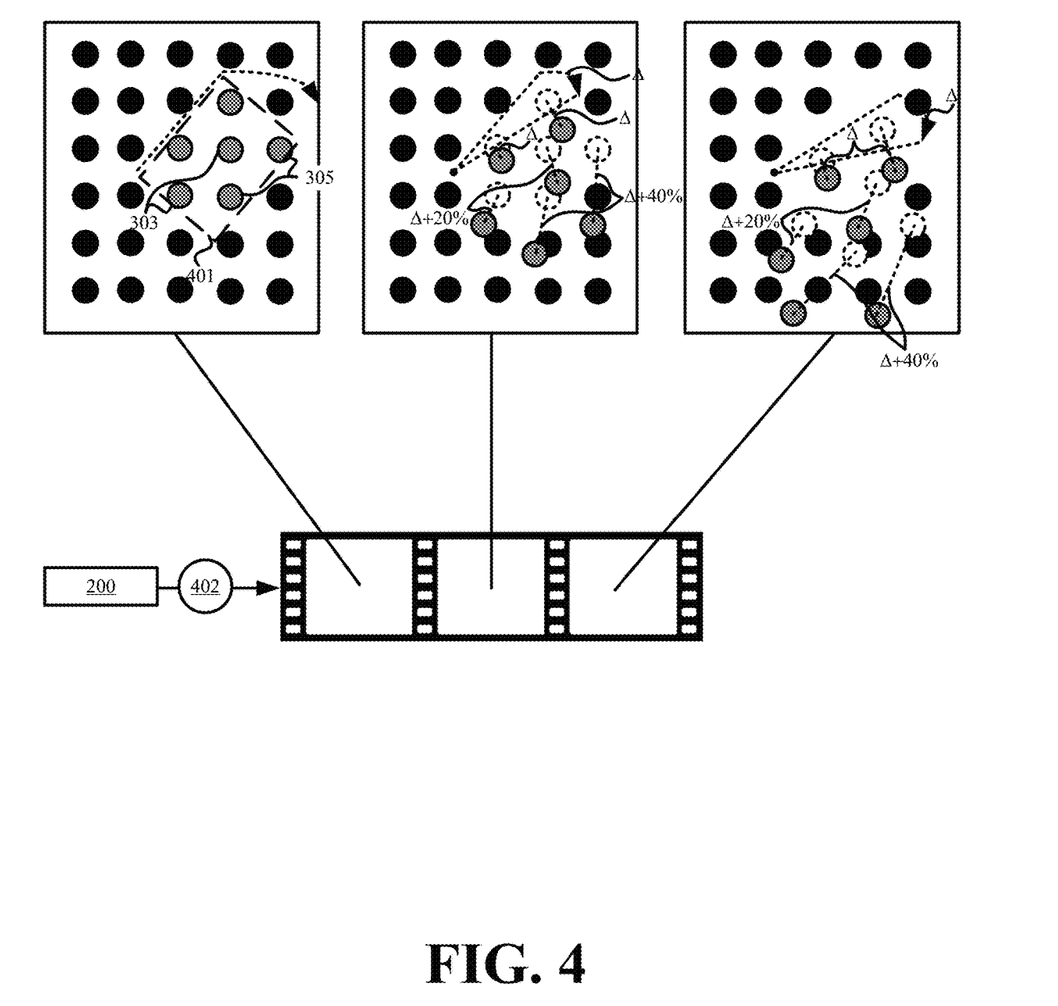
FIG. 4 illustrates an example of nonuniformly animating the set of points that are linked to the particular animation element based on influence adjustments applied to different subsets of the set of points in accordance with some embodiments presented herein.

FIG. 4 illustrates an example of nonuniformly animating the set of points that are linked to the particular animation element based on influence adjustments applied to different subsets of the set of points in accordance with some embodiments presented herein. The particular animation element is defined to rotate downwards about a pivot point, and set of points 401 linked to the particular animation element are defined to move proportionally with the movement defined for the particular animation element. First subset of points 303 and second subset of points 305 are influenced more heavily by the motion of the particular animation element based on the different applications of the influence tool to first subset of points 303 and to second subset of points 305 described with reference to FIG. 3. Accordingly, PCAS 200 renders (at 402) the animation by moving first subset of points 303 along the path of motion defined for the particular animation element and an additional 20% farther than the motion of the particular animation element, by moving second subset of points 305 along the path of motion defined for the particular animation element and an additional 40% farther than the motion of the particular animation element, and by moving all other points linked to the particular animation element move along the path of motion defined for the particular animation element while maintaining their relative position or distance to the particular animation element.

In some embodiments, PCAS 200 provides an enhanced user interface for assisting with the application of the influence tool and/or for visualizing the adjustments made with the influence tool. The enhanced user interface distinguishes between which set of points are rigged or linked to which animation elements of the animation framework, and visually presents the influence adjustments that have been made to the points so that the animation customizations are identified.

Figure 5:
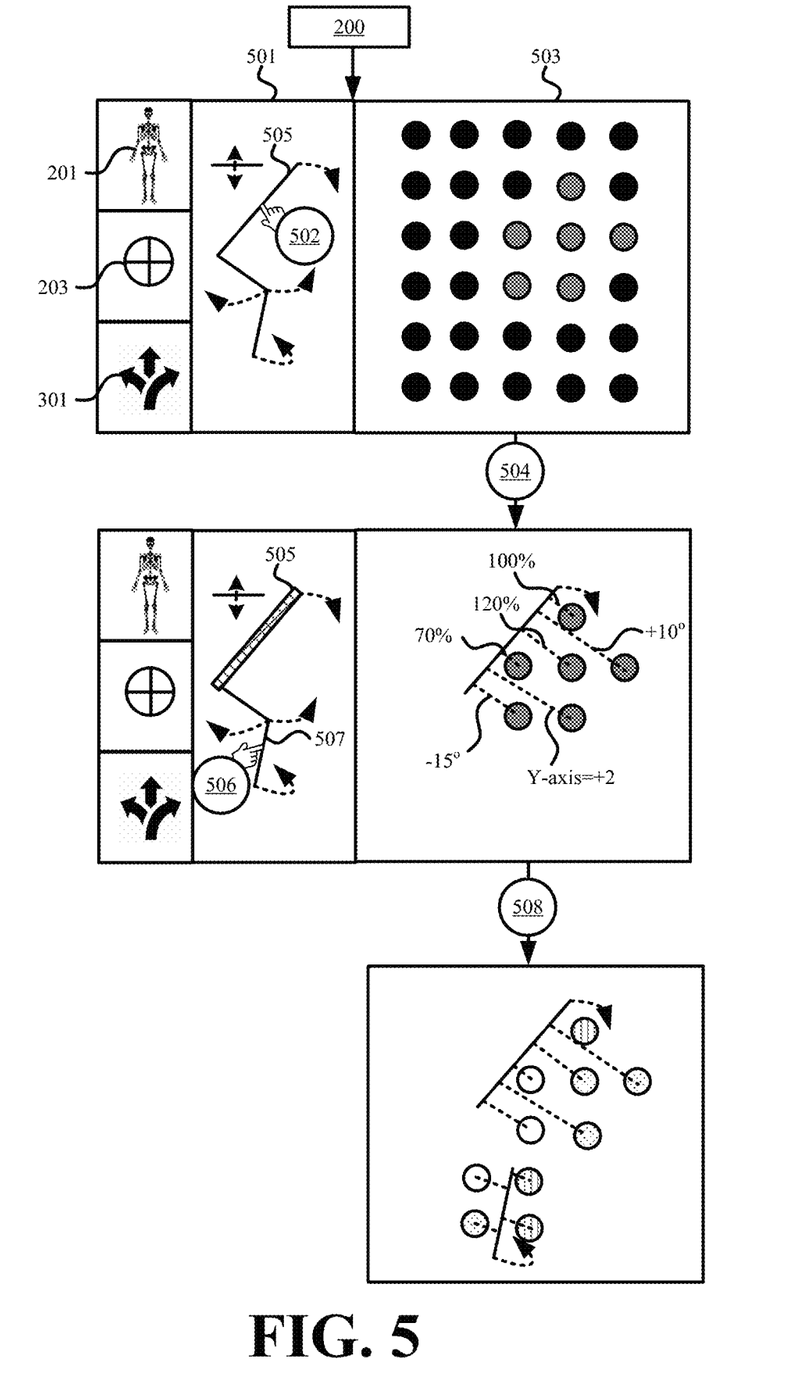
FIG. 5 illustrates an example of the enhanced user interface associated with the influence tool in accordance with some embodiments presented herein.

FIG. 5 illustrates an example of the enhanced user interface associated with the influence tool in accordance with some embodiments presented herein. The enhanced user interface includes UI elements or tools 201, 203, and 301 for creating and customizing the animation framework, animation element selection interface 501 for selecting between different animation elements that have been defined for the animation framework of a point cloud, and visualization window 503. In some embodiments, animation element selection interface 501 presents a visual representation for the defined animation framework with interactive or selectable UI element with which a user may select between the different animation elements of the defined animation framework. In any case, animation element selection interface 501 may present different bones, pivot points, or other animation elements of the animation framework as interactive or selectable UI elements.

PCAS 200 updates the enhanced user interface to present the set of points that are rigged or linked to an animation element that is selected from animation element selection interface 501. For instance, the user may select first UI element 505 in animation element selection interface 501 that represents a first animation element of the animation framework. PCAS 200 detects (at 502) the selection of first UI element 505, and updates (at 504) visualization window 503 to present the set of points that are linked to the first animation element, and to remove all other points of the point cloud that are not linked to that first animation element. PCAS 200 may also update the enhanced user interface to present a visual representation of the first animation element relative to the presented set of points in visualization window 503, the animation that is defined for the first animation element, and/or the influence defined between the first animation element and each point of the linked set of points.

The user may select multiple UI elements from animation element selection interface 501 to present different sets of points that are linked to different bones or animation elements of the animation framework at one time in visualization window 503. In some embodiments, PCAS 200 may color code, present graphical linkages, or otherwise visual differentiate the set of points to identify which set of points are linked to which animation element.

As shown in FIG. 5, PCAS 200 detects (at 506) the selection of second UI element 507 representing a second animation element in animation element selection interface 501. PCAS 200 updates (at 508) visualization window 503 to present the first set of points that are linked to the first animation element as the selection of first UI element 505 remains active, and the second set of points that are linked to the second animation element in response to the selection of second UI element 507. Other points of the point cloud may be hidden or removed from visualization window 503. PCAS 200 also updates (at 508) visualization window 503 to present the defined influence that each selected animation element has on each point of the set of points that is linked to that animation element. In some embodiments, the enhanced user interface color codes the points with an adjusted influence. For instance, a dotted point may correspond to a point that is animated with an increased offset or influence relative to the movement of the animation element, a point with vertical lines may correspond to a point that retains its position or distance to the animation element and the follows the movement of the animation element without any offset, and a transparent point may correspond to a point that is animated with a decreased offset or influence relative to the movement of the animation element. The user may then select one of the presented points in visualization window 503, and the enhanced user interface may present the influence associated with that point. In some embodiments, the enhanced user interface presents the points with their defined visual characteristics (e.g., colors) and presents visual connectors between each point and the linked animation element that represent the influence adjustment associated with that point.

The enhanced user interface readily identifies the influence adjustments that have been applied to different points that are linked to the same animation element. The user may then refine the influence adjustments in order to customize or tune the animation or to define complex animations in which points linked to the same animation element are animated nonuniformly relative to that animation element.

In some embodiments, the influence tool may be used to adjust various positional properties of points that are linked to an animation element over the course of the animation defined for that animation element. In some such embodiments, the influence tool may be used to not only increase or decrease the distance of a point relative to the animation element over the animation that is defined for the animation element, but to also adjust the position of the point relative to the position of the animation element. For example, if an animation element is defined to move about a pivot point with a 45 degree arc of rotation, the influence tool may be used to increase or decrease the angle with which one or more points move relative to the 45 degree arc of rotation defined for the animation element. As another example, if an animation element is defined to move vertically, the influence tool may be used to adjust the angle or direction by which one or more points move relative to the animation element. The amount by which to offset the position, angle, or other movement of points may be specified as additional configurable parameters of the influence tool.

Figure 6:
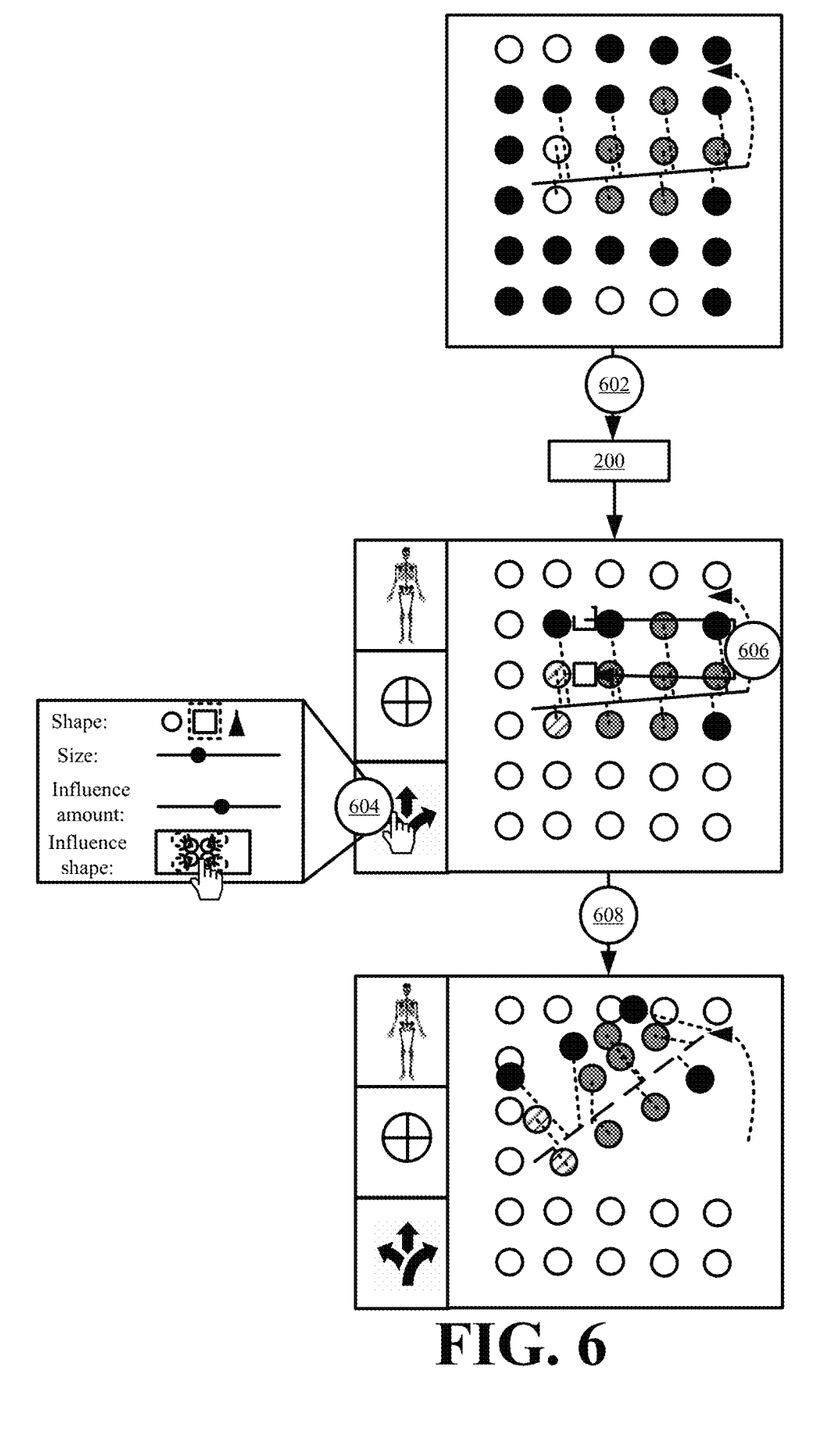
FIG. 6 illustrates an example of using the influence tool to adjust movements of selected points relative to a defined movement for an animation element that is linked to the selected points in accordance with some embodiments presented herein.

FIG. 6 illustrates an example of using the influence tool to adjust movements of selected points relative to a defined movement for an animation element that is linked to the selected points in accordance with some embodiments presented herein. A user defines the animation element and the animation for the animation element. The animation may involve moving the animation element upward about a pivot point with a 45 degree arc of rotation. A set of points are rigged to the animation element as part of the animation element definition. Accordingly, the set of points move or are animated relative to the movement or animation that is defined for the animation element. PCAS 200 receives (at 602) and stores the created animation element and the animation that is defined for that animation element.

To customize or refine the animation, a user activates and configures (at 604) the influence tool to compress the spacing or density of a selected subset of points by a specified amount over the course of the animation. The user applies (at 606) the influence tool to the selected subset of points. PCAS 200 adjusts the manner with which the set of points move relative to the movement of the animation element based on the configured settings. Specifically, PCAS 200 reduces the spacing between the points as the points move relative to the animation element.

PCAS 200 may render (at 608) the adjusted animation so that the user may visualize the results and may further adjust or tune the animation using the influence tool or other tools. In this example, the spacing between the selected subset of points decreases as the subset of points move along the path defined for the animation element.

To further simplify the creation of complex animations that involve various nonuniform movements of different subsets of a set of points as the collective set of points are moved in relation to movements defined for a particular animation element of the animation framework, PCAS 200 may provide predefined influence adjustments that model various complex animations. For instance, the features (e.g., fibers) that form different muscles contract and expand in nonlinear and nonuniform ways. Accurately representing muscle contraction and expansion by linking points to bones, pivot points, and animation elements of animation framework may be impossible, and defining different influence adjustments for different subsets of the points to accurately recreate the complex muscle movement may be time consuming and require numerous different influence adjustments. Accordingly, PCAS 200 provides the predefined influence adjustments to simplify the creation of these complex animations in a point cloud via a single application of the influence tool to the different subsets of points.

In some embodiments, PCAS 200 generates the predefined influence adjustments using one or more artificial intelligence and/or machine learning ("AI/ML") techniques. For instance, PCAS 200 may train a neural network based on one or more videos of the represented complex animation. As a specific example, PCAS 200 may provide one or more videos illustrating a bicep contraction and expansion as training data for the neural network. The AI/ML techniques associated with the neural network analyze the motion of the bicep to decompose the motion into a primary controlling motion and dependent motions that occur in relation to the primary controlling motion. The primary controlling motion corresponds to the primary motion off of which the dependent motions occur. In the example of bicep contraction, the primary controlling motion may include the upward motion of the arm towards the shoulder. The AI/ML techniques identify the animation element (e.g., the arm) that is associated with the controller motion. The AI/ML techniques then model the dependent motions that occur at different times of the primary controlling motion and that vary from the primary controlling motion. For instance, as the arm moves towards the shoulder, the AI/ML techniques detect nonuniform movements of different muscle fibers that deviate from the arm movement and that form the shape of the bicep contraction over the course of the arm movement. The positions and motion of the detected nonuniform movements are modeled and converted into influence adjustments for points located at positions from the animation element representing the arm.

Figure 7:
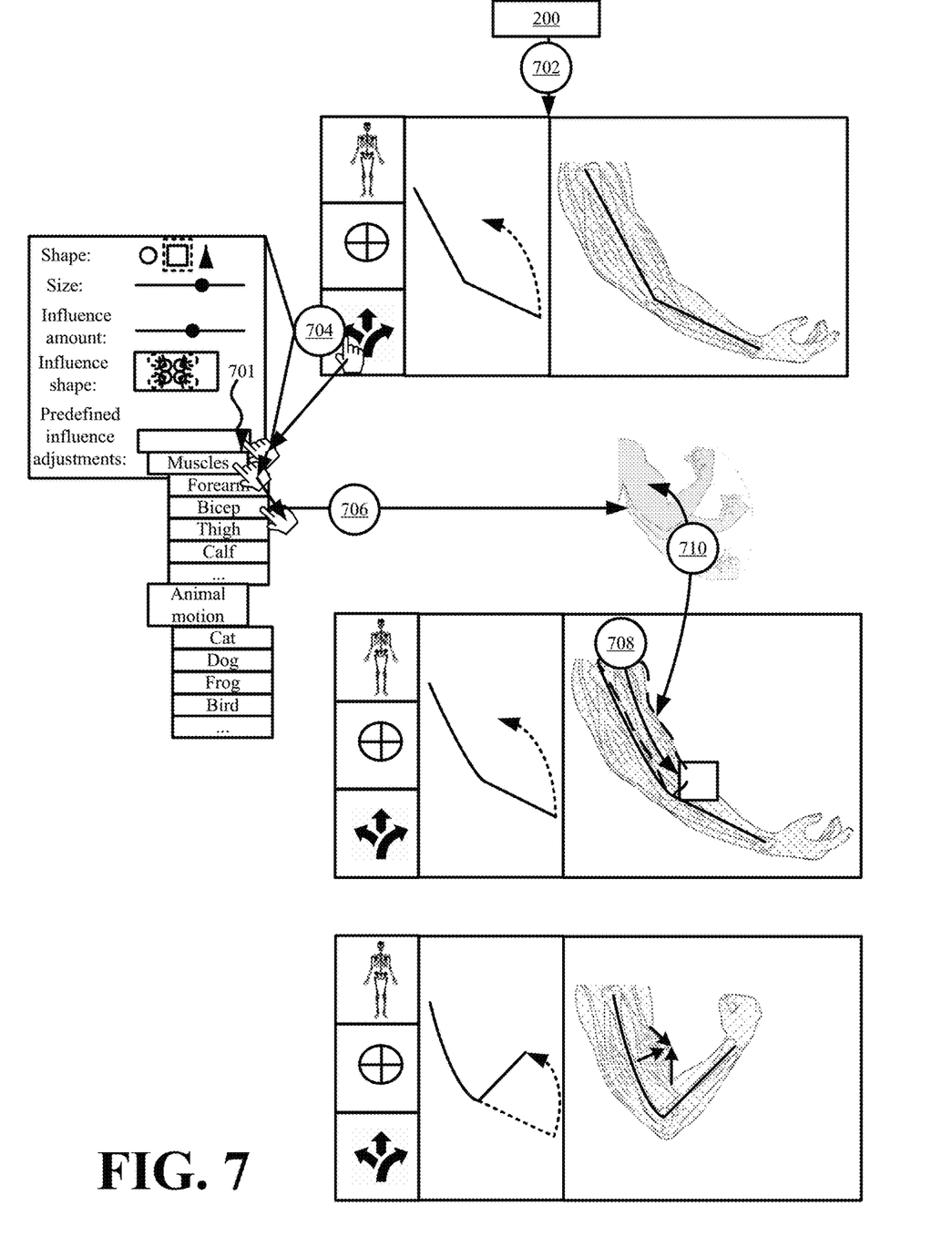
FIG. 7 illustrates an example of applying a predefined influence adjustment for a modeled complex animation to a set of points in accordance with some embodiments presented herein.

FIG. 7 illustrates an example of applying a predefined influence adjustment for a modeled complex animation to a set of points in accordance with some embodiments presented herein. PCAS 200 presents (at 702) a UI that renders points of a point cloud and that provides tools with which a user may define animation elements of an animation framework, define motion for the animation elements, and may rig different sets of points to one or more of the animation elements in order to animate the different sets of points according to the motion that was defined for the linked animation elements.

The UI also includes UI element 701 for activating the influence tool and for selecting between different predefined influence adjustments that are modeled after and/or generated to model different complex animations. PCAS 200 activates (at 704) the influence tool in response to a user selection of UI element 701. PCAS 200 presents configurable parameters with which the user may tune or adjust the influence tool and with which the user may select between different predefined influence adjustments for modeling or recreating different complex animations. PCAS 200 configures (at 706) the influence tool with a particular predefined influence adjustment that models the complex animation associated with a particular muscle contraction and extension in response to a user selection of that particular predefined influence adjustment.

PCAS 200 detects (at 708) the influence tool configured to model the particular predefined influence adjustment being applied to a set of points that are linked to an animation element representing an arm. PCAS 200 determines the positions of the set of points relative to the animation element, maps (at 710) the relative positioning between the set of points and the animation element to the positioning between different modeled muscle fibers and an arm, and adjusts (at 712) the animation of different subsets of the set of points that are linked to the animation element representing the arm based on the mapping and the animation adjustments defined for the modeled muscle fibers and/or the corresponding positions in the particular predefined influence adjustments.

In some embodiments, PCAS 200 dynamically adjusts (at 712) the movements that are defined for the animation element and that are transferred to the different subsets of points based on the positioning of the subsets of points relative to the animation element and adjusted movements that deviate from the arm movement and that are modeled for different muscle fibers in the particular predefined influence adjustment at the positions represented by the different subsets of points. More specifically, PCAS 200 determines the relative position of a subset of points to the animation element, selects influence adjustments that are modeled from deviating movements of muscle fibers at the same relative position to an arm, configures the parameters of the influence tool based on the selected influence adjustments, and dynamically applies the selected influence adjustments to the subset of points. Dynamically applying the selected influence adjustments includes modifying the movement of the subset of points relative to the movement defined for the linked animation element in order emulate the modeled movement of muscle fibers represented by the subset of points.

In some embodiments, PCAS 200 may have access to a library of different predefined influence adjustments for different objects and/or for different complex animations. For instance, the predefined influence adjustments may model the complex movements of different human muscles or muscles of different animals, wing flapping of different birds, running motions of different animals, elasticity of rubber bands, balls, and other objects, and/or other objects associated with complex animations.

The influence tool may have applications besides changing the animation for points that are rigged to an animation framework. In some embodiments, the influence tool may be used to customize the motion or animation associated with special effects. A special effect may be placed within a point cloud and applied to a set of point cloud points. The set of points may be animated according to motion or the animation of the special effect. The influence tool may be used to customize the special effect by adjusting the movement or animation of a subset of points from the set of points that are linked to the special effect so that the subset of points are nonuniformly animated relative to other points in the set of points and/or the motion that is defined for the special effect.

Figure 8:
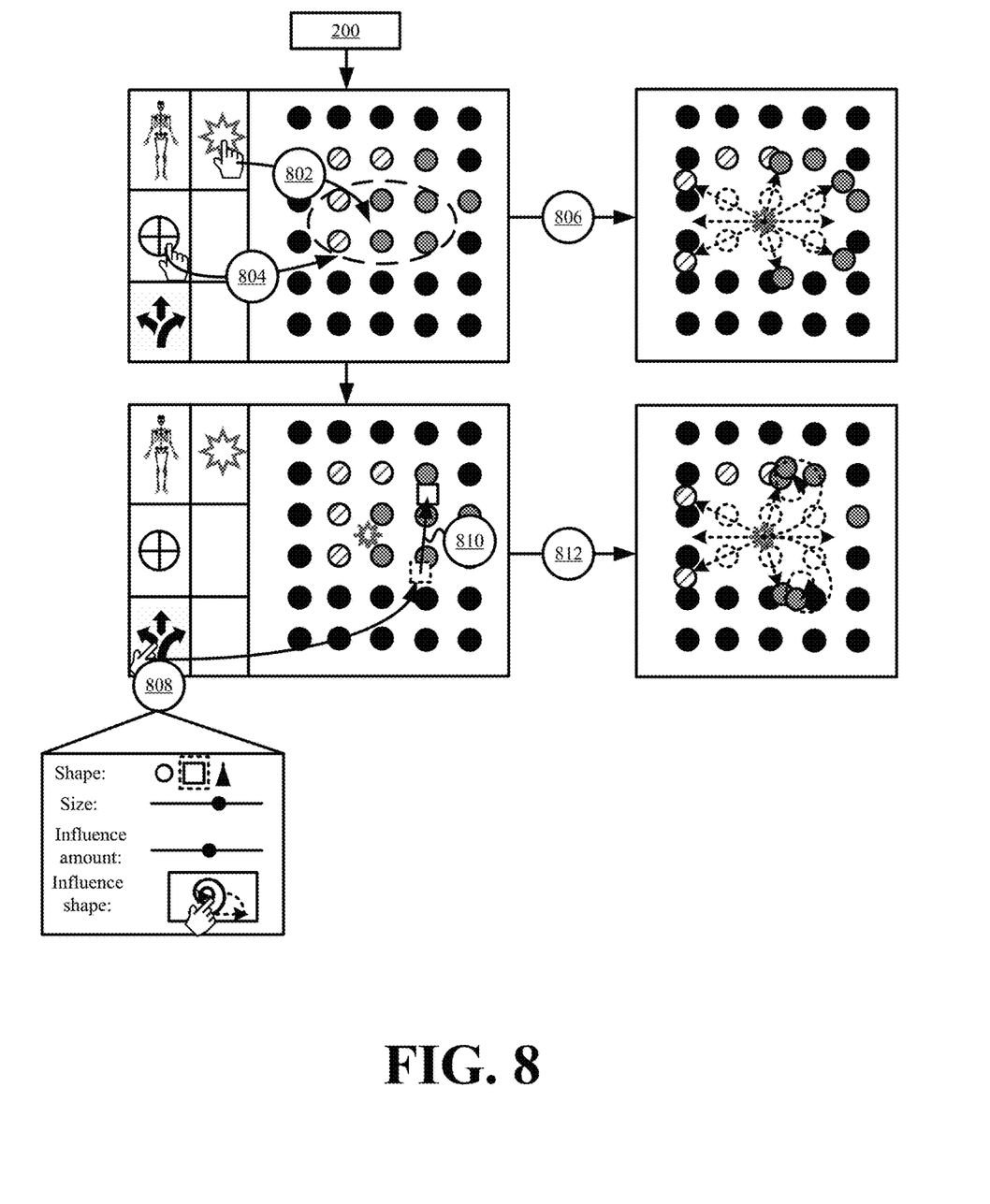
FIG. 8 illustrates an example of customizing an explosion effect with the influence tool in accordance with some embodiments presented herein

FIG. 8 illustrates an example of customizing an explosion effect with the influence tool in accordance with some embodiments presented herein. PCAS 200 presents points of a point cloud in a UI. A user may select, place, and orient an explosion effect in the UI. PCAS 200 tracks (at 802) the placement of the explosion effect within the 3D space of the point cloud. The explosion effect defines an animation that recreates the motion associated with an explosion. PCAS 200 also tracks (at 804) the rigging or linking of a set of points to the explosion effect. For instance, the user selects the set of points to associate with the explosion effect and to be animated according to animation defined for the explosion effect.

The explosion effect may define a uniform displacement of the set of points outwards and away from the center of the explosion effect depending on the point position relative to the center or placement of the explosion effect in the point cloud. PCAS 200 may render (at 806) the uniform displacement of the set of points that are rigged to the explosion effect in order for the user to visualize how they want to customize the explosion effect and/or the movement of some points from the set of points that are linked to the explosion effect.

To customize the influence that the explosion effect has on a subset of the set of points, the user activates the influence tool, configures (at 808) parameters of the influence tool that create the desired customization, and applies (at 810) the influence tool to a subset of the set of points by clicking, pressing, or otherwise enabling the influence tool over or on the subset of points.

PCAS 200 adjusts (at 812) the animation of the subset of points relative to the animation defined by the explosion effect in response to the application of the influence tool to the subset of points. For instance, the explosion effect may define a straight outward movement of the set of points away from the center of the explosion effect, and the influence tool may add a spiral movement to the selected subset of points as the selected subset of points move away from the center of the explosion effect. Adjusting (at 812) the animation may include PCAS 200 rendering the explosion effect that is linked to the set of points with the influence adjustment applied to the subset of the set of points so that the user may visualize the overall animation. The user may undo the influence adjustments if they do not produce the desired movements, or may further customize the animation by applying other influence adjustments to different points of the set of points.

In some embodiments, PCAS 200 stores the influence adjustments applied to the subset of points in one or more non-positional elements of the subset of points. For instance, PCAS 200 may store the additional spiral rotation that is added or that modifies the straight outward movement defined by explosion effect in one or more non-positional elements of the subset of points.

Figure 9:
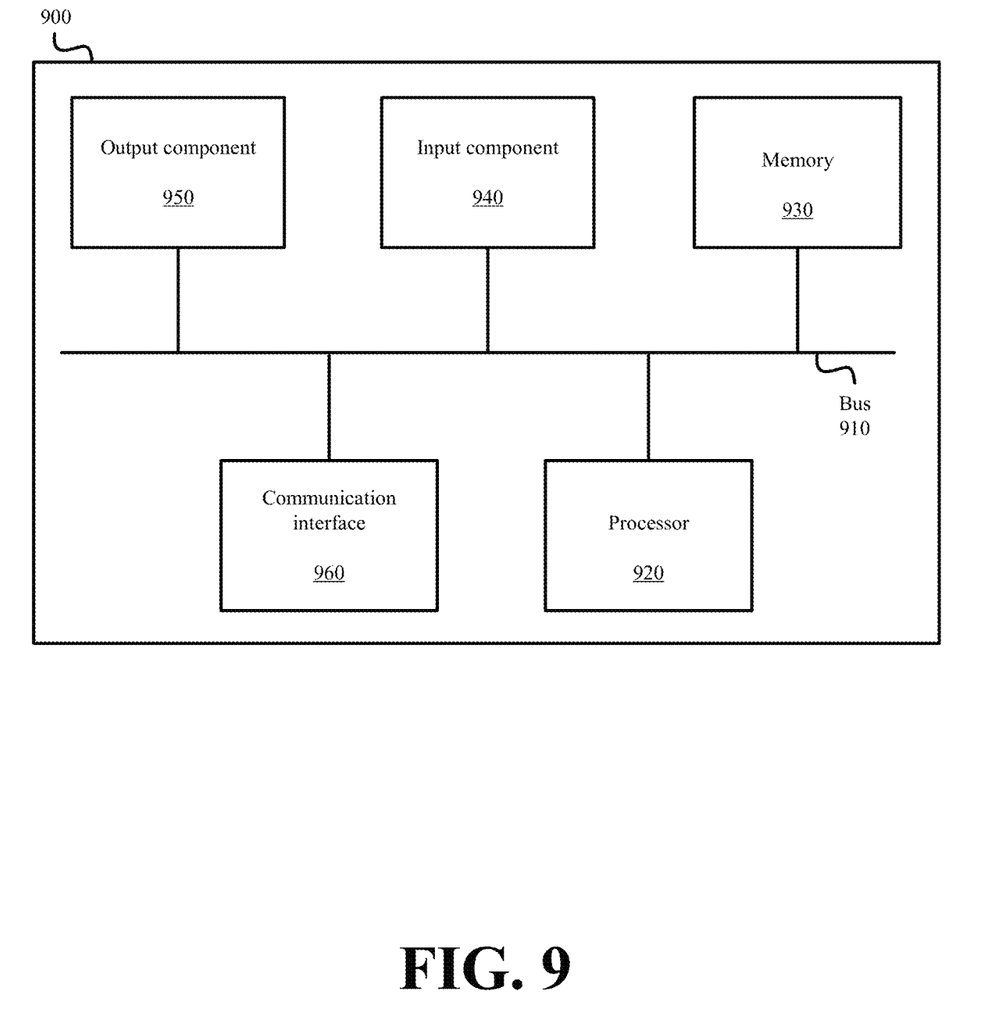
FIG. 9 illustrates example components of one or more devices, according to one or more embodiments described herein.

FIG. 9 is a diagram of example components of device 900. Device 900 may be used to implement one or more of the tools, devices, or systems described above (e.g., PCAS 200). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   receiving a point cloud comprising a plurality of points that are distributed across a three-dimensional ("3D") space and that collectively represent a 3D object;
   defining an animation element that is separate from the plurality of points of the point cloud;
   defining an animation for the animation element, wherein the animation specifies a change to a position, shape, or form of the animation element in the 3D space over a period of time;
   linking a set of points from the plurality of points to the animation element;
   adjusting an application of the animation from the animation element to a first subset of points from the set of points based on a selection of the first subset of points that is made using an adjustment tool; and
   rendering the animation by changing a position, shape, or form of a second subset of points from the set of points according to the animation that is defined for the animation element and by changing a position, shape, or form of the first subset of points according to the animation as adjusted by the adjustment tool, wherein the second subset of points does not include points in the first subset of points.

2. The method of claim 1 further comprising:
   activating the adjustment tool in response to a selection of a particular user interface ("UI") element from a plurality of UI elements.

3. The method of claim 1 further comprising:
   configuring one or more parameters of the adjustment tool prior to adjusting the application of the animation, wherein the one or more parameters modify an amount by which the animation from the animation element is transferred to the first subset of points selected with the adjustment tool.

4. The method of claim 1 further comprising:
   configuring one or more parameters of the adjustment tool prior to adjusting the application of the animation, wherein the one or more parameters modify a shape or motion of the animation from the animation element that is transferred to the first subset of points selected with the adjustment tool.

5. The method of claim 1, wherein defining the animation element comprises:
   selecting a first tool in a UI; and
   placing the animation element in the 3D space using the first tool.

6. The method of claim 5, wherein defining the animation comprises:
   selecting a second tool in the UI; and
   moving the animation element that is placed in the 3D space using the second tool.

7. The method of claim 5, wherein adjusting the application of the animation comprises:
   selecting the adjustment tool that corresponds to a second tool in the UI;
   configuring parameters of the adjustment tool that specify one or more changes to the animation of the animation element; and
   selecting the first subset of points using the adjustment tool.

8. The method of claim 1, wherein adjusting the application of the animation comprises:
   tracking an amount of time with which the adjustment tool is applied to the first subset of points;
   adjusting the application of the animation by a first amount in response to tracking a first amount of time with which the adjustment tool is applied to the first subset of points; and
   adjusting the application of the animation by a different second amount in response to tracking a second amount of time with which the adjustment tool is applied to the first subset of points.

9. The method of claim 1, wherein adjusting the application of the animation comprises:
   modifying an amount by which positions of the first subset of points are influenced by the animation of the animation element to be greater or less than an amount by which positions of the second subset of points are influenced by the animation of the animation element.

10. The method of claim 1, wherein rendering the animation comprises:
    retaining a position of the second subset of points relative to the animation element as a position of the animation element changes over a course of the animation; and
    modifying a position of the first subset of points with an increasing offset from the position of the animation element as a position of the animation element changes over the course of the animation as a result of said adjusting.

11. The method of claim 1,
    wherein changing the position, shape, or form of the second subset of points comprises adjusting a position of each point from the second subset of points in a direction that follows the animation of the animation element; and
    wherein changing the position, shape, or form of the first subset of points comprises adjusting a position of each point from the first subset of points with a deviation from the animation of the animation element.

12. The method of claim 11 further comprising:
    configuring the deviation in one or more parameters of the adjustment tool.

13. The method of claim 1 further comprising:
modeling a complex animation involving different features moving differently from a primary controlling movement; and
wherein adjusting the application of the animation comprises:
mapping the animation to the primary controlling movement; and
mapping movements of the different features to the first subset of points based on positions of the first subset of points relative to the animation element matching starting positions of the different features relative to a position at which the primary controlling movement commences.

14. The method of claim 1, wherein adjusting the application of the animation comprises:
selecting a predefined influence adjustment that models a plurality of movements occurring relative to a primary controlling movement; and
adjusting positioning of the first subset of points relative to the animation element based on a position at which each movement of the plurality of movements occurs relative to the primary controlling movement and the positioning of one or more points from the first subset of points relative to the animation element matching the position at which a particular movement of the plurality of movements occurs relative to the primary controlling movement.

15. An animation system comprising:
one or more hardware processors configured to:
receive a point cloud comprising a plurality of points that are distributed across a three-dimensional ("3D") space and that collectively represent a 3D object;
define an animation element that is separate from the plurality of points of the point cloud;
define an animation for the animation element, wherein the animation specifies a change to a position, shape, or form of the animation element in the 3D space over a period of time;
link a set of points from the plurality of points to the animation element;
adjust an application of the animation from the animation element to a first subset of points from the set of points based on a selection of the first subset of points that is made using an adjustment tool; and
render the animation by changing a position, shape, or form of a second subset of points from the set of points according to the animation that is defined for the animation element and by changing a position, shape, or form of the first subset of points according to the animation as adjusted by the adjustment tool, wherein the second subset of points does not include points in the first subset of points.

16. The animation system of claim 15, wherein the one or more hardware processors are further configured to:
activate the adjustment tool in response to a selection of a particular user interface ("UI") element from a plurality of UI elements.

17. The animation system of claim 15, wherein the one or more hardware processors are further configured to:
configure one or more parameters of the adjustment tool prior to adjusting the application of the animation, wherein the one or more parameters modify an amount by which the animation from the animation element is transferred to the first subset of points selected with the adjustment tool.

18. The animation system of claim 15, wherein the one or more hardware processors are further configured to:
configure one or more parameters of the adjustment tool prior to adjusting the application of the animation, wherein the one or more parameters modify a shape or motion of the animation from the animation element that is transferred to the first subset of points selected with the adjustment tool.

19. The animation system of claim 15, wherein adjusting the application of the animation comprises:
modifying an amount by which positions of the first subset of points are influenced by the animation of the animation element to be greater or less than an amount by which positions of the second subset of points are influenced by the animation of the animation element.

20. A non-transitory computer-readable medium storing instructions that, when executed by one or more processors of an animation system, cause the animation system to perform operations comprising:
receiving a point cloud comprising a plurality of points that are distributed across a three-dimensional ("3D") space and that collectively represent a 3D object;
defining an animation element that is separate from the plurality of points of the point cloud;
defining an animation for the animation element, wherein the animation specifies a change to a position, shape, or form of the animation element in the 3D space over a period of time;
linking a set of points from the plurality of points to the animation element;
adjusting an application of the animation from the animation element to a first subset of points from the set of points based on a selection of the first subset of points that is made using an adjustment tool; and
rendering the animation by changing a position, shape, or form of a second subset of points from the set of points according to the animation that is defined for the animation element and by changing a position, shape, or form of the first subset of points according to the animation as adjusted by the adjustment tool, wherein the second subset of points does not include points in the first subset of points.

* * * * *